United States Patent
Wiesenberg

(10) Patent No.: US 10,884,410 B2
(45) Date of Patent: Jan. 5, 2021

(54) SYSTEMS AND METHODS FOR DETERMINING WHETHER A VEHICLE IS CAPABLE OF NAVIGATING AN INTERSECTION IN AN AUTONOMOUS DRIVING MODE

(71) Applicant: Toyota Motor Engineering & Manufacturing North America, Inc., Plano, TX (US)

(72) Inventor: Ryan M. Wiesenberg, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 315 days.

(21) Appl. No.: 15/929,029

(22) Filed: Jun. 29, 2018

(65) Prior Publication Data

US 2020/0004243 A1  Jan. 2, 2020

(51) Int. Cl.
*G05D 1/00* (2006.01)
*B60Q 9/00* (2006.01)
(Continued)

(52) U.S. Cl.
CPC .......... *G05D 1/0088* (2013.01); *B60Q 9/00* (2013.01); *B60W 50/14* (2013.01); *G05D 1/021* (2013.01);
(Continued)

(58) Field of Classification Search
CPC .......... G05D 1/0088; G05D 1/0021; G05D 2201/0213; B60Q 9/00; B60W 50/14; B60W 2554/00; B60W 2552/05
(Continued)

(56) References Cited

U.S. PATENT DOCUMENTS 8,788,134 B1 * 7/2014 Litkouhi ............ B62D 15/0255
                                                             701/23
9,805,601 B1 * 10/2017 Fields .............. G08G 1/096791
(Continued)

OTHER PUBLICATIONS

Pin Wang et al., "Formulation of Deep Reinforcement Learning Architecture Toward Autonomous Driving for On-Ramp Merge" California Path Program, ITS, University of California, Berkeley undated in 6 pages.
(Continued)

*Primary Examiner* — Yazan A Soofi
(74) *Attorney, Agent, or Firm* — Christopher G. Darrow; Darrow Mustafa PC

(57) ABSTRACT

Systems, methods, and other embodiments for determining whether a vehicle is capable of navigating an intersection in an autonomous driving mode are disclosed. One embodiment detects that a vehicle traveling on a first roadway is approaching an intersection of the first roadway with a second roadway; detects, during one or more layer drives, one or more moving objects traveling on the second roadway; estimates the profile of each of one or more sensor obstructions situated in a non-roadway region abutting the intersection based on the detected one or more moving objects; combines, for each sensor obstruction, the profile estimates obtained from one or more layer drives to produce a composite estimate of the profile of that sensor obstruction; and determines, based at least in part on one or more composite profile estimates, whether navigating the intersection in an autonomous driving mode of the vehicle is achievable.

20 Claims, 7 Drawing Sheets

(51) Int. Cl.
*B60W 50/14* (2020.01)
*G05D 1/02* (2020.01)

(52) U.S. Cl.
CPC ..... *B60W 2552/05* (2020.02); *B60W 2554/00* (2020.02); *G05D 2201/0213* (2013.01)

(58) Field of Classification Search
USPC .......................................................... 701/27
See application file for complete search history.

(56) References Cited

U.S. PATENT DOCUMENTS

| | | | |
|---|---|---|---|
| 2013/0325241 A1* | 12/2013 | Lombrozo | B60W 40/00 701/23 |
| 2016/0231746 A1* | 8/2016 | Hazelton | B60W 30/00 |
| 2017/0368936 A1* | 12/2017 | Kojima | B60K 28/06 |
| 2018/0089563 A1* | 3/2018 | Redding | G06N 3/08 |
| 2018/0190046 A1* | 7/2018 | Levinson | G07C 5/0808 |

OTHER PUBLICATIONS

David Isele et al., "Navigating Occluded Intersections with Autonomous Vehicles Using Deep Reinforcement Learning," IEEE International Conference on Robotics and Automation (ICRA 2018) in 6 pages.

Chris Urmson et al., "Autonomous Driving in Urban Environments: Boss and the Urban Challenge," Journal of Field Robotics 25(8), 425-466 (2008).

Junging Wei et al., "Autonomous Vehicle Social Behavior for Highway Entrance Ramp Management," 2013 IEEE Intelligent Vehicles Symposium (IV), Jun. 23-26, 2013 in 7 pages.

\* cited by examiner

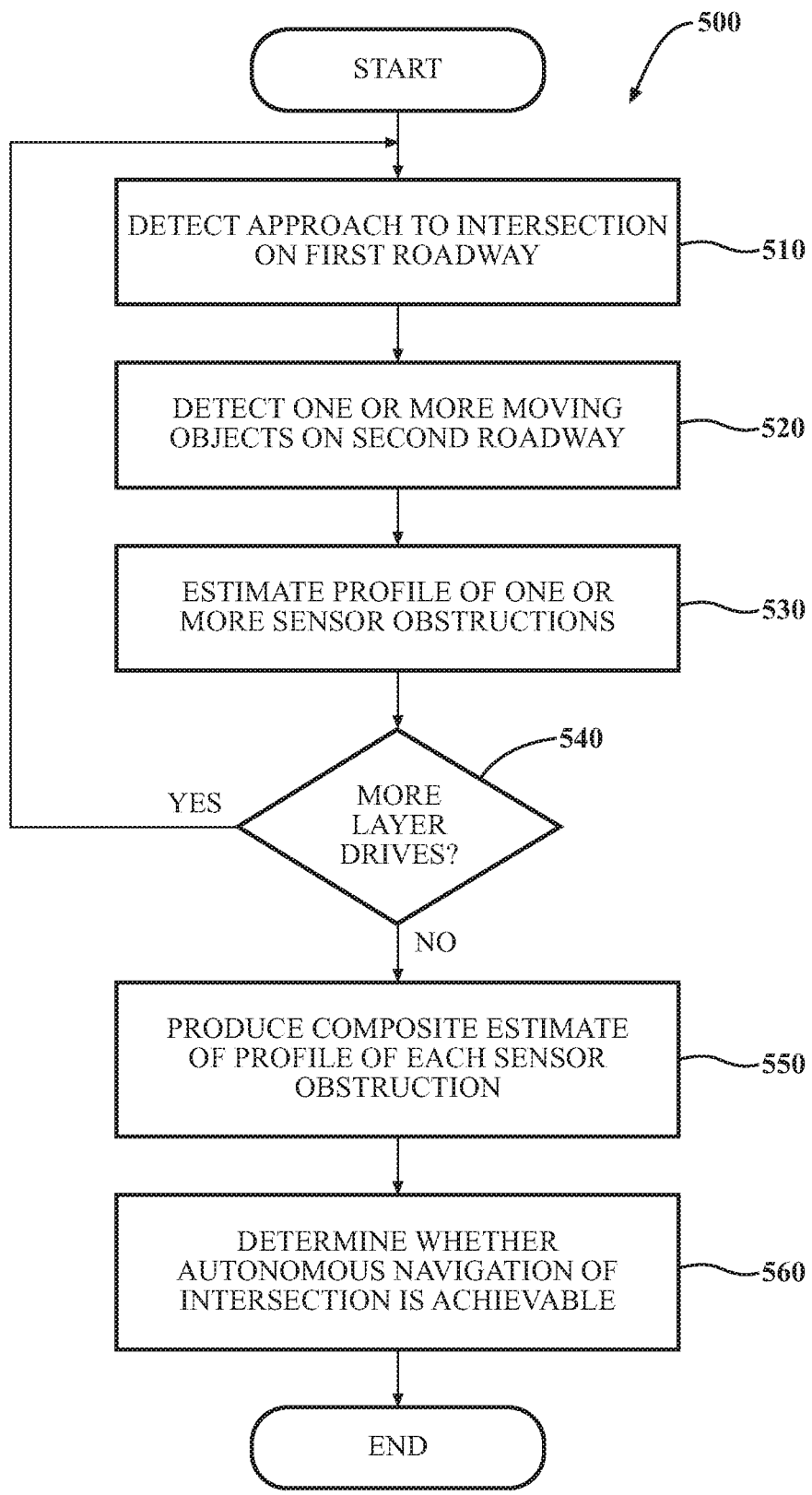

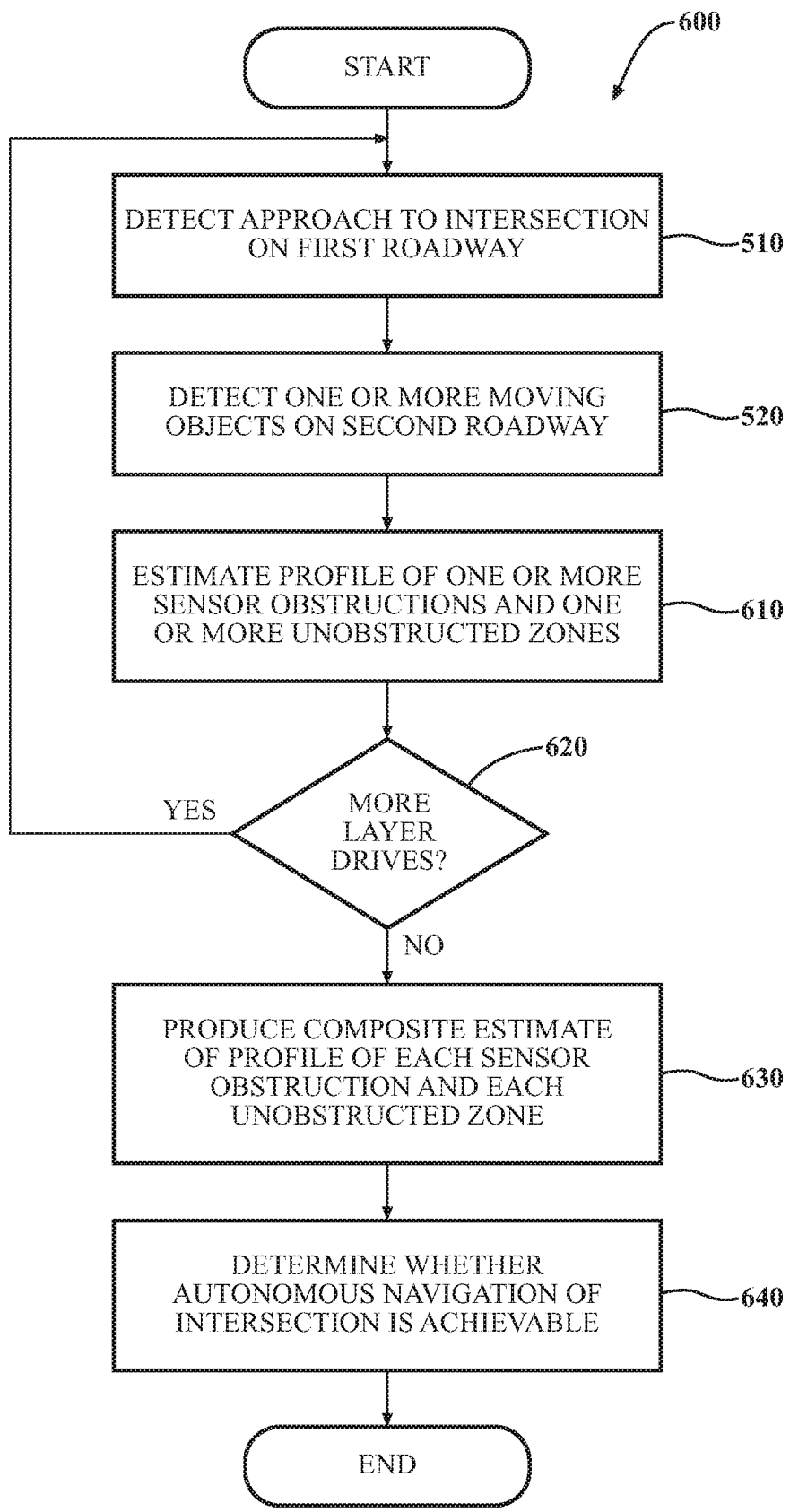

SYSTEMS AND METHODS FOR DETERMINING WHETHER A VEHICLE IS CAPABLE OF NAVIGATING AN INTERSECTION IN AN AUTONOMOUS DRIVING MODE

TECHNICAL FIELD

The subject matter described herein relates generally to autonomous vehicles and, more particularly, to systems and methods for determining whether such a vehicle is capable of navigating an intersection while operating in an autonomous driving mode.

BACKGROUND

Autonomous vehicles can sense a surrounding environment (e.g., obstacles, roadway, other vehicles, pedestrians, etc.) and navigate autonomously through the surrounding environment without human input or at least partially without human input. That is, autonomous vehicles can operate according to different levels of autonomy. For example, an autonomous vehicle can operate according to the Society of Automotive Engineers (SAE) Level 3, "Conditional Automation." In this autonomous driving mode, an autonomous vehicle performs all aspects of a dynamic driving task but with the expectation that a human driver will intervene (e.g., take over manual control of steering and acceleration/deceleration), if a situation arises that the autonomous vehicle is not able to handle on its own.

One situation in which an autonomous vehicle may experience difficulties requiring a handover to a human driver is when approaching an intersection. For example, an autonomous vehicle merging onto a controlled-access or limited-access highway via an on-ramp may have difficulty sensing vehicles or other moving objects traveling on the roadway it is entering due to obstructions such as hills, vegetation, construction equipment, road signs, etc., in the non-roadway region between the on-ramp and the highway. This generally triangular-shaped non-roadway region between the on-ramp and the controlled-access or limited-access highway is often referred to as the "gore." The map data on which autonomous vehicles rely does not provide details about potential sensor obstructions in the gore. Similar challenges due to obstructions (vegetation, buildings, signs, etc.) can also arise at a typical intersection of surface streets.

Conventionally, when a difficult intersection with sensor obstructions is encountered, some systems notify a human driver that the autonomous vehicle is not capable of navigating the intersection autonomously, forcing the human driver to take manual control of the vehicle.

SUMMARY

Systems, methods, and other embodiments for determining whether a vehicle is capable of navigating an intersection in an autonomous driving mode are disclosed. One embodiment is a system for determining whether a vehicle is capable of navigating an intersection in an autonomous driving mode. The system includes one or more processors communicably coupled to a memory. The memory stores an intersection detection module including instructions that, when executed by the one or more processors, cause the one or more processors to detect, during each of one or more layer drives in which the vehicle is traveling on a first roadway, that the vehicle is approaching an intersection of the first roadway with a second roadway. The memory also stores an intersection characterization module including instructions that when executed by the one or more processors cause the one or more processors to detect, during each of the one or more layer drives, one or more moving objects traveling on the second roadway. Those instructions also cause the one or more processors to produce, during each of the one or more layer drives, an estimate of a profile of each of one or more sensor obstructions situated in a non-roadway region abutting the intersection based on the detected one or more moving objects. Those instructions also cause the one or more processors to combine, for each of the one or more sensor obstructions, the estimates of the profile of that sensor obstruction obtained from the one or more layer drives to produce a composite estimate of the profile of that sensor obstruction. Those instructions also cause the one or more processors to determine, based at least in part on the composite estimate of the profile of each of the one or more sensor obstructions, whether navigating the intersection in an autonomous driving mode of the vehicle is achievable.

Another embodiment is a non-transitory computer-readable medium for determining whether a vehicle is capable of navigating an intersection in an autonomous driving mode. The non-transitory computer-readable medium stores instructions that when executed by one or more processors cause the one or more processors to detect, during each of one or more layer drives in which the vehicle is traveling on a first roadway, that the vehicle is approaching an intersection of the first roadway with a second roadway. Those instructions also cause the one or more processors to detect, during each of the one or more layer drives, one or more moving objects traveling on the second roadway. Those instructions also cause the one or more processors to produce, during each of the one or more layer drives, an estimate of a profile of each of one or more sensor obstructions situated in a non-roadway region abutting the intersection based on the detected one or more moving objects. Those instructions also cause the one or more processors to combine, for each of the one or more sensor obstructions, the estimates of the profile of that sensor obstruction obtained from the one or more layer drives to produce a composite estimate of the profile of that sensor obstruction. Those instructions also cause the one or more processors to determine, based at least in part on the composite estimate of the profile of each of the one or more sensor obstructions, whether navigating the intersection in an autonomous driving mode of the vehicle is achievable.

Another embodiment is a method of determining whether an vehicle is capable of navigating an intersection in an autonomous driving mode. The method comprises detecting, during each of one or more layer drives in which the vehicle is traveling on a first roadway, that the vehicle is approaching an intersection of the first roadway with a second roadway. The method also detects, during each of the one or more layer drives, one or more moving objects traveling on the second roadway. The method also produces, during each of the one or more layer drives, an estimate of a profile of each of one or more sensor obstructions situated in a non-roadway region abutting the intersection based on the detected one or more moving objects. The method also combines, for each of the one or more sensor obstructions, the estimates of the profile of that sensor obstruction obtained from the one or more layer drives to produce a composite estimate of the profile of that sensor obstruction. The method also determines, based at least in part on the composite estimate of the profile of each of the one or more sensor obstructions, whether navigating the intersection in an autonomous driving mode of the vehicle is achievable.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 5 is a flowchart of a method of determining whether a vehicle is capable of navigating an intersection in an autonomous driving mode, in accordance with an illustrative embodiment of the invention.

FIG. 6 is a flowchart of a method of determining whether a vehicle is capable of navigating an intersection in an autonomous driving mode, in accordance with another illustrative embodiment of the invention.

DETAILED DESCRIPTION

Systems, methods, and other embodiments associated with determining whether a vehicle is capable of navigating an intersection while operating in an autonomous driving mode are disclosed. Initially, the autonomous driving system of an autonomous vehicle might classify a particular intersection as not verified or approved for autonomous navigation because the map data on which the vehicle relies does not include sufficient information about potential sensor obstructions in a non-roadway region abutting the intersection (e.g., the gore, in the case of an on-ramp, or a corner, in the case of an intersection of surface streets) ("non-roadway region"). Consequently, when the vehicle encounters such an intersection while operating in an autonomous driving mode, the vehicle is forced to perform a handover to a human driver.

Whether a vehicle can navigate a particular intersection autonomously ultimately depends on how much information the vehicle has about the intersection—in particular, any sensor obstructions that might exist in the non-roadway region. The systems, methods, and other embodiments disclosed herein determine whether a vehicle is capable of navigating a particular intersection in an autonomous driving mode by automatically gathering information about a non-roadway region of an intersection as the autonomous vehicle travels from place to place, whether it is operating in an autonomous driving mode or is being manually driven by a human driver. During one or more encounters with the intersection, the autonomous vehicle automatically detects one or more moving objects (e.g., automobiles, bicycles, motorcycles, pedestrians, etc.) to acquire information about sensor obstructions or, in some embodiments, both sensor obstructions and unobstructed zones in the non-roadway region. An estimated profile of a sensor obstruction or unobstructed zone obtained during one encounter with the intersection can be combined with those obtained during other encounters to produce a composite estimate of the profile of a sensor obstruction or unobstructed zone. Based on this information and predetermined criteria, the autonomous driving system of the vehicle can determine whether or not autonomous navigation of the intersection is achievable.

Figure 1:
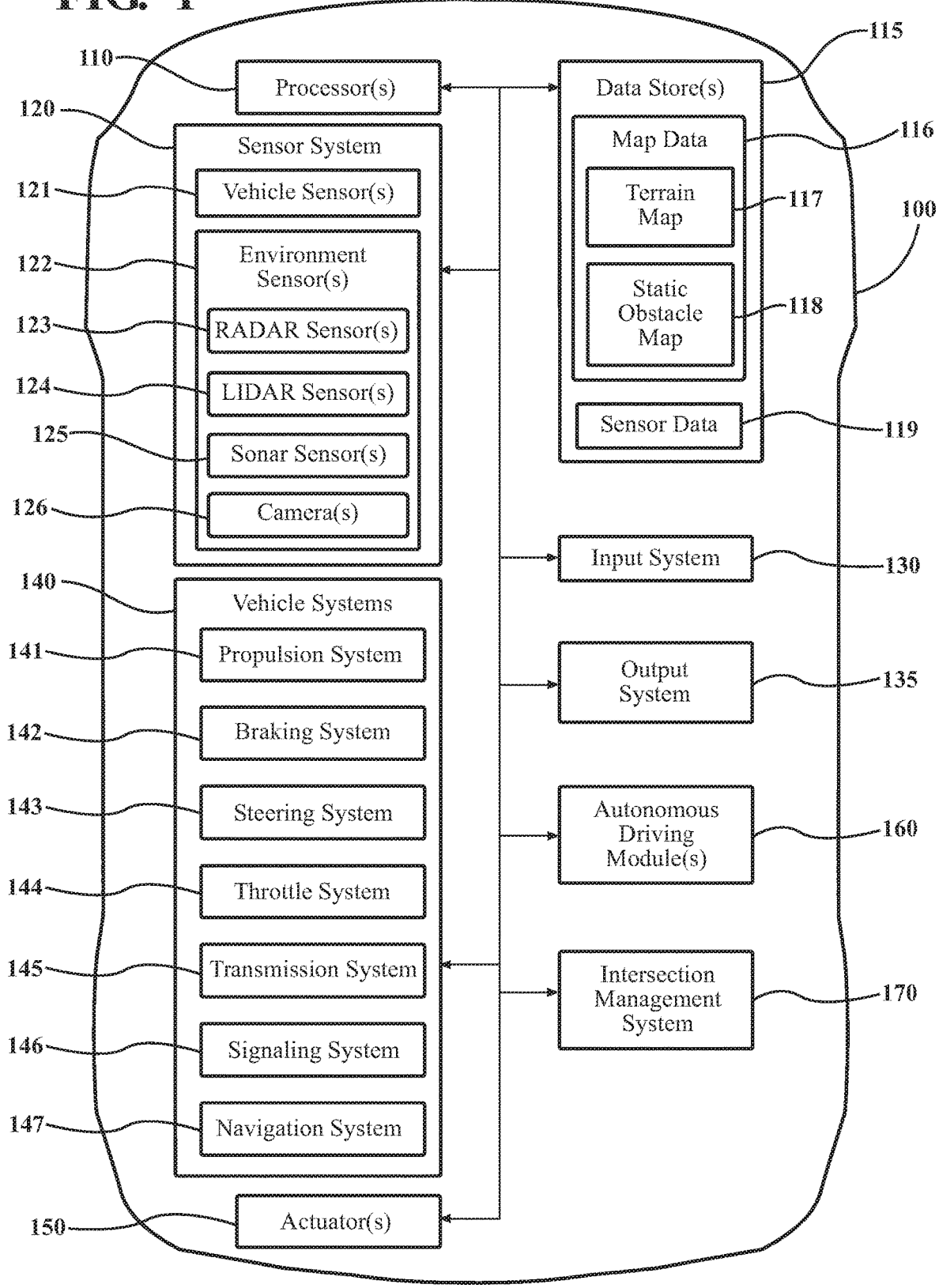
FIG. 1 illustrates one embodiment of an autonomous vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Vehicle 100 includes intersection management system 170, which is implemented to perform methods and other functions as disclosed herein relating to determining whether a vehicle is capable of navigating an intersection in an autonomous driving mode. It should be appreciated that the intersection management system 170 can take many different forms but, in general, functions to (1) detect that vehicle 100 is approaching a particular intersection identified from map data; (2) characterize, during each of one or more layer drives, one or more sensor obstructions or, in some embodiments, one or more sensor obstructions and one or more unobstructed zones that are situated in a non-roadway region by detecting one or more moving objects; and (3) determine, based in part on the characterizations of the one or more sensor obstructions or the one or more sensor obstructions and the one or more unobstructed zones, whether the vehicle 100 is capable of navigating the intersection in an autonomous driving mode. These functions are discussed in greater detail in connection with FIGS. 2-6.

Figure 2:
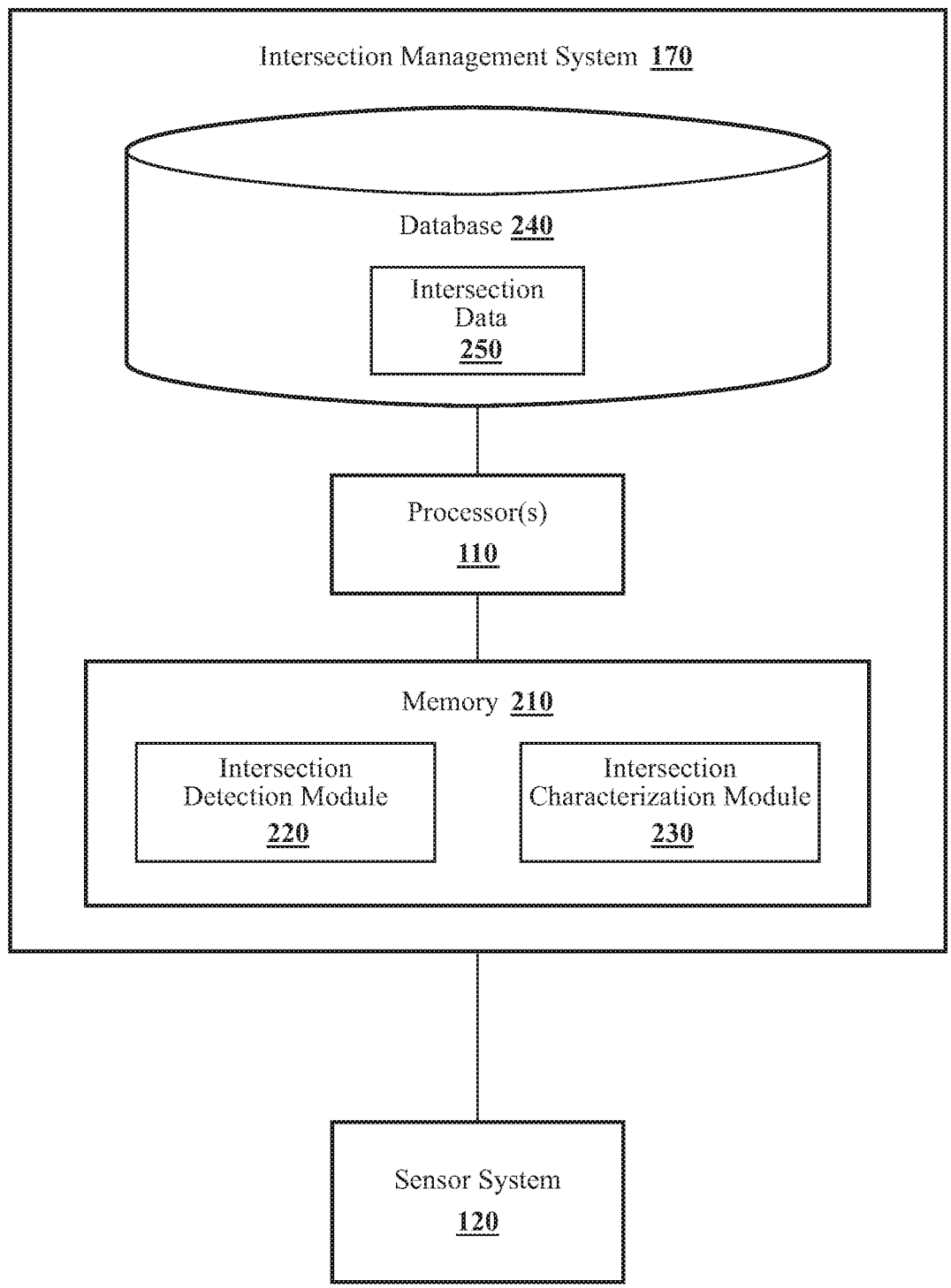
FIG. 2 illustrates one embodiment of an intersection management system.

With reference to FIG. 2, one embodiment of the intersection management system 170 of FIG. 1 is further illustrated. The intersection management system 170 is shown as including one or more processors 110 from the vehicle 100 of FIG. 1. Accordingly, the one or more processors 110 may be a part of the intersection management system 170, the intersection management system 170 may include one or more separate processors from the one or more processors 110 of the vehicle 100, or the intersection management system 170 may access the one or more processors 110 through a data bus or another communication path. In one embodiment, the intersection management system 170 includes a memory 210 that stores an intersection detection module 220 and an intersection characterization module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the one or more processors 110, cause the one or more processors 110 to perform the various functions disclosed herein.

The intersection detection module 220 generally includes instructions that cause the one or more processors 110 to detect that the vehicle 100 is approaching an intersection of a first roadway with a second roadway. For purposes of this description only, the vehicle 100 is consistently but arbitrarily deemed to be traveling on the "first roadway" as it approaches the intersection. As those skilled in the art will recognize, there are different kinds of intersections, and the nature of the first roadway and the second roadway can differ, depending on the particular embodiment. In some embodiments, the first roadway is an on-ramp and the second roadway is a controlled-access highway (e.g., a freeway) or a limited-access highway (e.g., an expressway). In other embodiments, the reverse is true: the first roadway is a controlled-access or limited-access highway, and the second roadway is an on-ramp. In other words, intersection management system 170 can gather information about a non-roadway region of an intersection whether the vehicle 100 is traveling on an on-ramp or on the primary roadway (e.g., freeway or expressway) with which the on-ramp merges. The principles of the various embodiments of the invention described herein apply equally to either scenario. In some embodiments, the intersection is an intersection of surface streets.

More specifically, intersection detection module 220 causes the one or more processors 110 to ascertain, via navigation system 147 (shown in FIG. 1), that vehicle 100 is approaching an intersection. For example, intersection detection module 220 may cause the one or more processors to analyze stored map data 116 and GPS coordinates received from navigation system 147. In some embodiments, intersection detection module 220 can also cause the one or more processors 110 to retrieve data from the sensors of a sensor system 120 of the vehicle 100 in connection with detecting that the vehicle 100 is approaching an intersection. When intersection detection module 220 has detected that vehicle 100 is approaching an intersection, intersection detection module 220 informs intersection characterization module 230.

Intersection characterization module 230 generally includes instructions that cause the one or more processors 110 to characterize (gather information about) sensor obstructions or, in some embodiments, both sensor obstructions and unobstructed zones that are situated in a non-roadway region, as defined above. This characterization process generally includes estimating the profile of a given sensor obstruction or unobstructed zone, as explained further below. Intersection characterization module 230 also generally includes instructions that cause the one or more processors 110 to determine, based at least in part on the information gathered about the sensor obstructions or both the sensor obstructions and the unobstructed zones, whether navigating the intersection in an autonomous driving mode of the vehicle 100 is achievable.

One aspect of intersection characterization module 230 is detecting one or more moving objects traveling on the second roadway as the vehicle 100 approaches the intersection while traveling on the first roadway. Moving objects can include, without limitation, automobiles, bicycles, motorcycles, and pedestrians. Intersection characterization module 230 detects the one or more moving objects by causing the one or more processors 110 to analyze data received from the sensor system 120. The sensor data analyzed can include, without limitation, one or more of camera image, LIDAR, RADAR, and Sonar data. Techniques for identifying and tracking both stationary and moving objects in the context of autonomous vehicles using such sensor data are well known in the art.

Another aspect of intersection characterization module 230 is estimating the profile of each of one or more sensor obstructions that are situated in a non-roadway region. In some embodiments, only sensor-obstruction profiles are estimated. In other embodiments, intersection characterization module 230 includes instructions to estimate the profile of each of one or more unobstructed zones that are situated in the non-roadway region, in addition to estimating the profiles of any sensor obstructions that might exist. In one embodiment, the profile of a sensor obstruction or unobstructed zone is estimated as a polygon.

A sensor obstruction is a stationary object in the non-roadway region that interferes with the ability of the sensor system 120 of the vehicle 100 traveling on the first roadway of the intersection to detect moving objects on the second roadway. It is analogous to a view obstruction, in human terms. Where the first roadway is an on-ramp, a sensor obstruction in the non-roadway region (the gore) can complicate the ability of the vehicle 100 to merge onto the second roadway (e.g., a freeway) in an autonomous driving mode. The same is true if the first roadway is controlled-access or limited-access highway and the second roadway is an on-ramp. In the case of an intersection of surface streets, a sensor obstruction such as a building located at an intervening corner can complicate the ability of the vehicle 100 to proceed across the second roadway in an autonomous driving mode. In short, sensor obstructions can cause a "blind merge" or "blind corner" for the vehicle 100, in some situations.

An unobstructed zone is a portion of the non-roadway region that does not include a sensor obstruction. As explained in greater detail below, intersection characterization module 230 can estimate the profile of a sensor obstruction or an unobstructed zone based on the detection of the one or more moving objects.

In some embodiments, intersection characterization module 230 characterizes the non-roadway region of an intersection based on the detection of one or more moving objects during a single encounter with the intersection. In other embodiments, another aspect of intersection characterization module 230 is combining the results of multiple encounters with a particular intersection to produce a composite estimate of the profile of each of one or more sensor obstructions or, in some embodiments, each of one or more sensor obstructions and each of one or more unobstructed zones. The reason for combining multiple estimates is that the estimated profile of a sensor obstruction or an unobstructed zone can differ somewhat from encounter to encounter, depending on the particular moving objects that are detected, their positions, and the position of the vehicle 100 when those moving objects are detected, as explained further below. Thus, intersection characterization module 230 gathers additional information about the non-roadway region during each encounter with the intersection in which intersection detection module 220 detects at least one moving object on the second roadway. In one embodiment, the multiple polygonal estimates of the profile of a particular sensor obstruction or unobstructed zone obtained during a plurality of encounters with a particular intersection can be superposed (layered) to obtain a composite estimate of the profile. An encounter with the intersection during which the intersection detection module 220 detects at least one moving object is herein termed a "layer drive" (i.e., a drive that produces a polygonal profile estimate forming one layer of an eventual composite profile estimate).

Intersection characterization module 230 keeps track of the layer drives and resulting profile estimates associated with a particular intersection in intersection data 250, which is stored in database 240. In some embodiments, the profile-estimate data pertaining to sensor obstructions can be integrated with or linked to static obstacle map 118. As noted above, the characterization of the non-roadway region of an intersection can be based on profile estimates obtained from one or more layer drives. In some embodiments, the composite profile estimates for sensor obstructions or, in some embodiments, for both sensor obstructions and unobstructed zones are required to be based on a predetermined minimum number of layer drives (e.g., five, in one embodiment). This is to ensure that sufficient information has been gathered about the non-roadway region before a decision is made regarding whether the vehicle 100 is capable of navigating the intersection in an autonomous driving mode.

Another aspect of intersection characterization module 230 is determining, based at least in part on the composite estimate of the profile of each of one or more sensor obstructions in the non-roadway region, whether navigating the intersection in an autonomous driving mode of the vehicle is achievable. That is, intersection characterization module 230 determines, based on the information gathered concerning the non-roadway region, whether the vehicle 100 is capable of navigating the intersection in an autonomous driving mode controlled by autonomous driving module(s) 160. In some embodiments, this determination is also based, at least in part, on the composite estimate of the profile of each of one or more unobstructed zones in the non-roadway region. This achievability determination for an intersection can be based on criteria such as, without limitation, the merging distance allotted to a particular on-ramp, the size of the estimated profile of one or more sensor obstructions in the non-roadway region, and the level of confidence in the characterization of the sensor obstructions. Generally, the shorter the permitted merging distance, the more problematic a large sensor obstruction (one with a large profile) becomes. For an intersection of surface streets, the achievability criteria can include, without limitation, the speed limit, the size of the profile of one or more sensor obstructions in the non-road region (corner), and whether or not the intersection is controlled with traffic signals or stop signs in one or more directions. In general, autonomous navigation of an intersection is achievable when intersection characterization module 230 can trace one or more rays demonstrating the existence of one or more unobstructed paths for sensor system 120 to receive sensor signals concerning moving objects on the second roadway. Intersection characterization module 230 analyzes the composite estimates of the profiles of one or more sensor obstructions or, additionally, in some embodiments, one or more unobstructed zones in the non-roadway region to determine achievability.

In some embodiments, another aspect of intersection characterization module 230 is to notify a human driver or other occupant of the vehicle 100 that autonomous navigation of a particular intersection is achievable or non-achievable, as the case may be. This notification can be provided via one or more status lights on an instrument panel, a textual message on a display of vehicle 100, an audible indicator (e.g., a beep, a tone, a recorded message, a synthesized text-to-speech message, etc.), a tactile indication (e.g., vibration), or a combination of these. In one embodiment, intersection characterization module 230 notifies a human driver or other occupant of vehicle 100 that a sensor obstruction not detected during one or more prior layer drives at a particular intersection has been detected during the current layer drive. This alerts the human driver or other occupant to be particularly vigilant, if the vehicle 100 is operating in an autonomous driving mode, and permits the human driver or other occupant to decide whether or not to take over manual control of vehicle 100.

Although a human driver or other occupant of the vehicle 100 can be notified of the achievability status of a particular intersection, it should be noted that intersection management system 170 can perform its various information-gathering functions automatically as vehicle 100 travels from place to place, regardless of whether the vehicle 100 is operating in a manual driving mode or an autonomous driving mode and without the need for any involvement or intervention from a human diver.

In some embodiments, intersection characterization module 230, in combining multiple estimates of the profile of a sensor obstruction or unobstructed zone to produce a composite estimate of the profile, applies a statistical confidence interval to the plurality of superposed polygons, each individual polygon from a layer drive being treated as a sample from a statistical distribution. That is, the profile of the sensor obstruction or unobstructed zone can be estimated to within a specified degree of statistical confidence (e.g., greater than 95%, in some embodiments). Placing confidence intervals on the sensor-obstruction characterizations helps to account for things like a construction vehicle being parked temporarily in a particular location during a layer drive. On such an occasion, the intersection characterization module 230 would conclude that there is a sensor obstruction, but that sensor obstruction might not be present during a subsequent layer drive.

In some embodiments, intersection characterization module 230 includes instructions that cause an estimate of the profile of a sensor obstruction or unobstructed zone obtained during a given layer drive to expire automatically after a predetermined period. For example, if map data 116 is updated on a monthly basis, the intersection data 250 that intersection characterization module 230 gathers during layer drives and stores in database 240 can be set up to expire after a one-month period. It should be noted that an intersection classified as "achievable" at one point in time may no longer be classified as such at a later time due to changed conditions in the non-roadway region (e.g., construction equipment or signs added since the last set of layer drives were performed). The reverse is also true: An intersection previously classified as "non-achievable" may be determined to be achievable at a later time due to changed conditions (e.g., construction equipment or signs present during a past set of layer drives are no longer present).

Figure 3A:
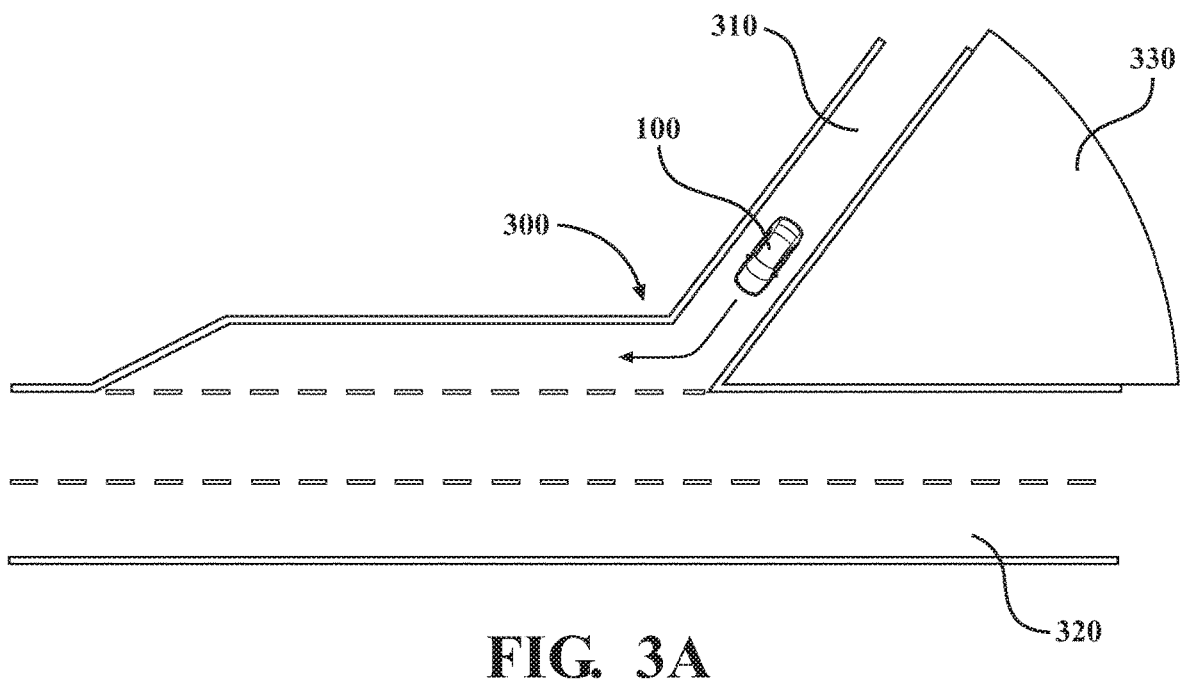
FIG. 3A illustrates an environment, an on-ramp, in which systems and methods disclosed herein may be deployed, in accordance with an illustrative embodiment of the invention.

FIG. 3A illustrates an environment, in particular an on-ramp, in which systems and methods disclosed herein may be deployed, in accordance with an illustrative embodiment of the invention. FIG. 3A depicts an intersection 300 where a first roadway 310, an on-ramp, intersects with a second roadway 320 (e.g., a freeway or expressway). Between these two roadways and adjacent to them is a non-roadway region 330. Vehicle 100 in FIG. 3A, traveling on the first roadway 310, is sometimes referred to by those skilled in the autonomous-vehicle art as the "ego vehicle." As discussed above, intersection characterization module 230 includes instructions that cause the one or more processors 110 to characterize the non-roadway region 330 automatically as vehicle 100 encounters intersection 300 on one or more occasions (i.e., during one or more layer drives). How this is accomplished is discussed below in connection with FIGS. 3B-3D.

Figure 3B:
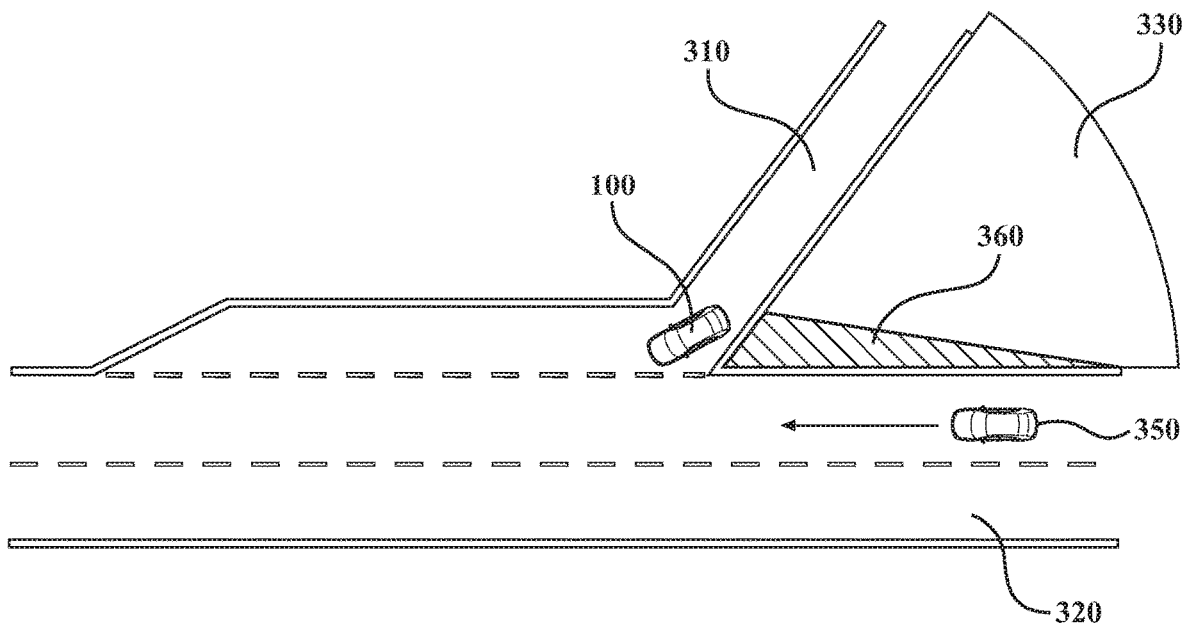
FIG. 3B illustrates detecting a moving object to characterize an unobstructed zone during a layer drive, in accordance with an illustrative embodiment of the invention.

FIG. 3B illustrates detecting a moving object to characterize an unobstructed zone during a layer drive, in accordance with an illustrative embodiment of the invention. In FIG. 3B, vehicle 100 has, at the position shown on first roadway 310 (the on-ramp), a clear, unobstructed path for intersection characterization module 230, via sensor system 120, to detect a moving object 350 traveling on the second roadway 320. In FIG. 3B, the moving object is depicted as an automobile, but, as discussed above, several other types of moving objects or dynamic objects can also be detected such as bicycles, motorcycles, or pedestrians. By detecting moving object 350 and measuring its position at one or more time instants, intersection characterization module 230 can produce an estimate 360 of the profile of an unobstructed zone in the non-roadway region 330. In this particular embodiment, the estimate is in the form of a polygon. This estimate 360 of the profile of the unobstructed zone is based on only a single first layer drive corresponding to a specific set of circumstances (i.e., the relative timing and positions of vehicle 100 and moving object 350 on the first and second roadways 310 and 320, respectively). Further information about the unobstructed zone and other aspects of non-roadway region 330 can be gleaned from subsequent layer drives, as discussed below in connection with FIG. 3C.

Figure 3C:
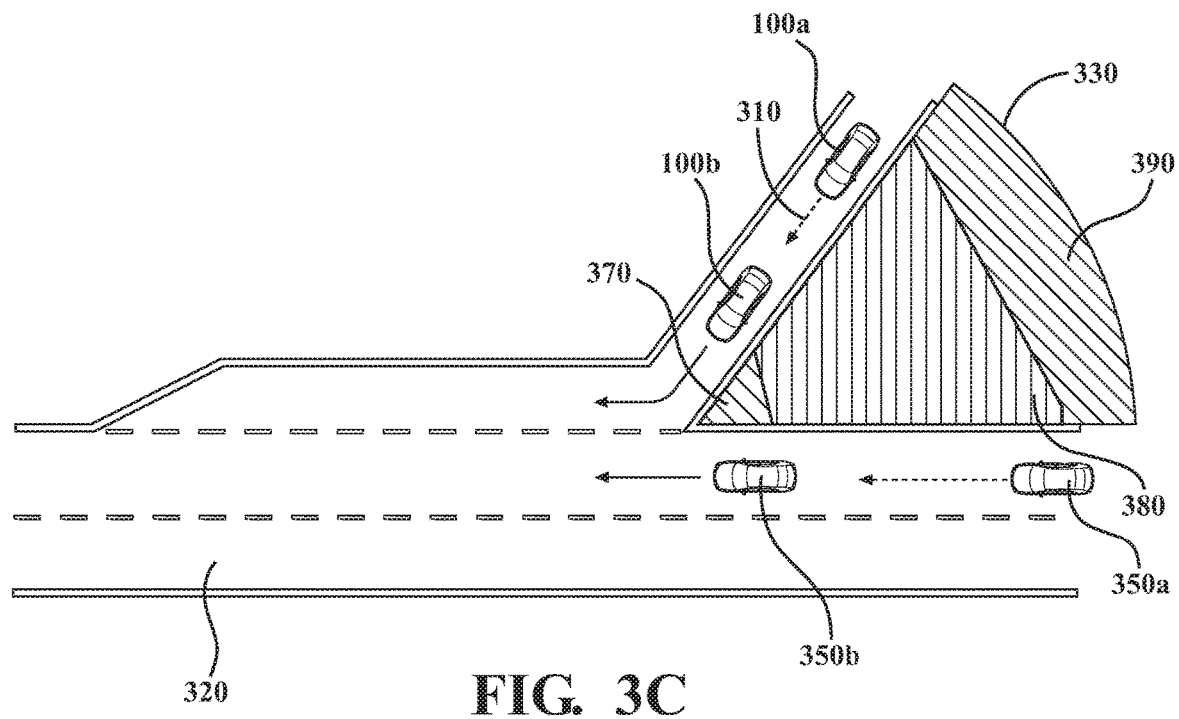
FIG. 3C illustrates detecting a moving object at a first time and a second later time to characterize a sensor obstruction and associated unobstructed zones, in accordance with an illustrative embodiment of the invention.

FIG. 3C illustrates detecting a moving object at a first time and a second later time to characterize a sensor obstruction and associated unobstructed zones, in accordance with an illustrative embodiment of the invention. In FIG. 3C, vehicle 100 and moving object 350 are each shown at two different points in time and in two different locations. Vehicle 100 at time $T_0$ is labeled 100a, and vehicle 100 at a later time $T_1$ is labeled 100b in FIG. 3C. Likewise, moving object 350 at time $T_0$ is labeled 350a, and moving object 350 at time $T_1$ is labeled 350b in FIG. 3C. At time $T_0$, vehicle 100 has a clear path for intersection characterization module 230 to detect moving object 350a via sensor system 120. This permits intersection characterization module 230 to produce an estimate 390 of the profile of an unobstructed zone. Between times $T_0$ and $T_1$, intersection characterization module 230 is unable to track the moving object 350 due to a sensor obstruction. Based on that information, characterization module 230 can produce an estimate 380 of the profile of the sensor obstruction. Later, at time $T_1$, intersection characterization module 230 is again able to detect the moving object 350b. This permits intersection characterization module 230 to produce an estimate 370 of the profile of another unobstructed zone within non-roadway region 330.

Figure 3D:
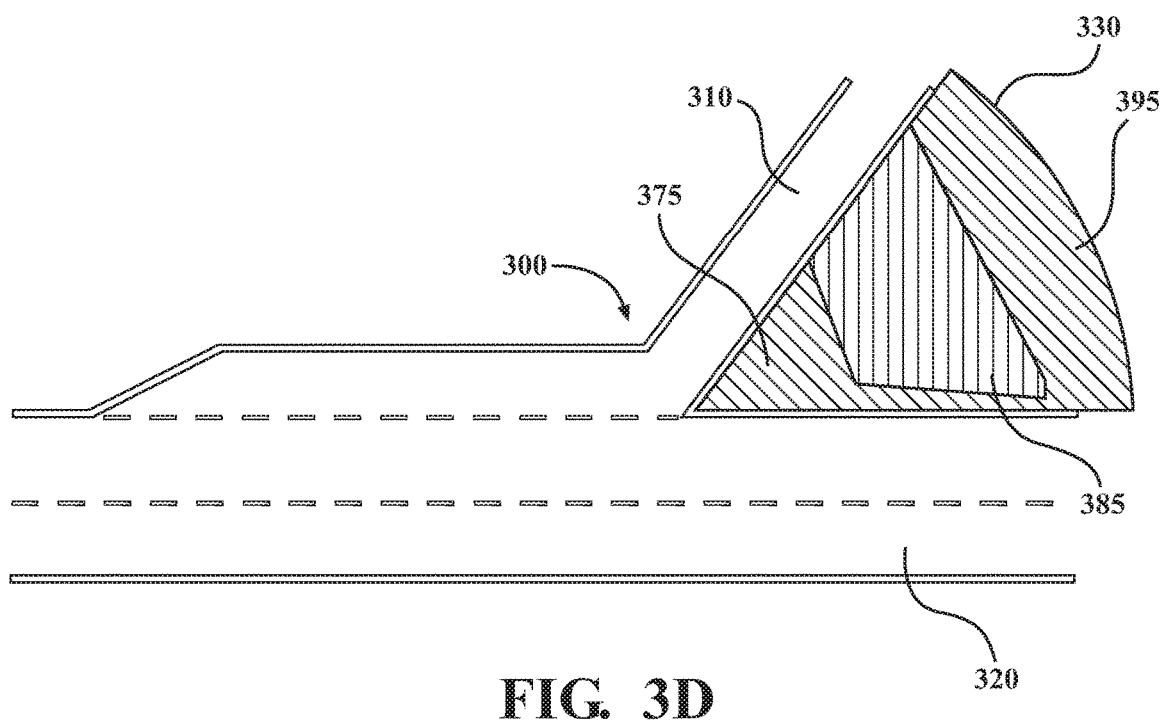
FIG. 3D illustrates composite estimates of the profiles of a sensor obstruction and associated unobstructed zones obtained by combining polygonal estimates from layer drives, in accordance with an illustrative embodiment of the invention.

FIG. 3D illustrates composite estimates of the profiles of a sensor obstruction and associated unobstructed zones obtained by combining polygonal estimates from multiple layer drives, in accordance with an illustrative embodiment of the invention. FIG. 3D is an example of what the composite estimates of the profiles of sensor obstructions and unobstructed zones within non-roadway region 330 might look like after a plurality of layer drives. As explained above, in one embodiment, each composite or combined estimate of the profile of a sensor obstruction or unobstructed zone is obtained by superposing the polygonal estimates obtained from the plurality of layer drives. As also explained above, a statistical confidence interval can be applied to the composite estimates.

FIGS. 3A-3D are intended to provide an example of how intersection characterization module 230 can infer information about the profile of a sensor obstruction or unobstructed zone by measuring at least one position of each of one or more moving objects. Many other scenarios different from the ones depicted in FIGS. 3A-3D are possible. For example, in a different embodiment, vehicle 100 travels on a freeway or expressway (e.g., the roadway labeled 320 in FIGS. 3A-3D), and intersection characterization module 230 detects one or more moving objects traveling on the on-ramp (the roadway labeled 310 in FIGS. 3A-3D). In other words, intersection characterization module 230 is not limited to characterizing a non-roadway region when the vehicle 100 is traveling on an on-ramp. The same techniques described above apply when the vehicle 100 passes by an on-ramp while traveling on a controlled-access or limited-access highway.

As a further example of the many possible variations, referring once again to FIG. 3C, if intersection characterization module 230 were, in an alternate scenario, unable to detect moving object 350a (moving object 350 at time $T_0$) because of a larger sensor obstruction that occupies the region labeled 390 in FIG. 3C in addition to the profile estimate labeled 380, intersection characterization module 230 can estimate the profile of the sensor obstruction by employing what could be termed "backward interpolation." That is, if intersection characterization module 230 first detects the moving object 350 at time $T_1$ (Element 350b in FIG. 3C), intersection characterization module 230 can infer that a sensor obstruction prevented detecting the moving object 350 from some time prior to $T_0$ to time $T_1$. This would permit intersection characterization module 230 to estimate the position of moving object 350 at time $T_0$ (Element 350a in FIG. 3C) by backward interpolation based on certain simplifying assumptions such as constant speed for the moving object 350 during the time from $T_0$ to $T_1$. Thus, in this alternate scenario, intersection characterization module 230 can estimate the profile of the sensor obstruction as including all of non-roadway region 330 except the estimate 370 of the unobstructed zone in FIG. 3C.

FIGS. 3A-3D depict a single moving object 350, but in other embodiments, multiple moving objects can be detected and their positions measured at one or more time instants in a similar fashion. That is, the techniques discussed in connection with FIGS. 3A-3D can be extended to the detection of a plurality of moving objects simultaneously, as those skilled in the art will recognize.

Figure 4:
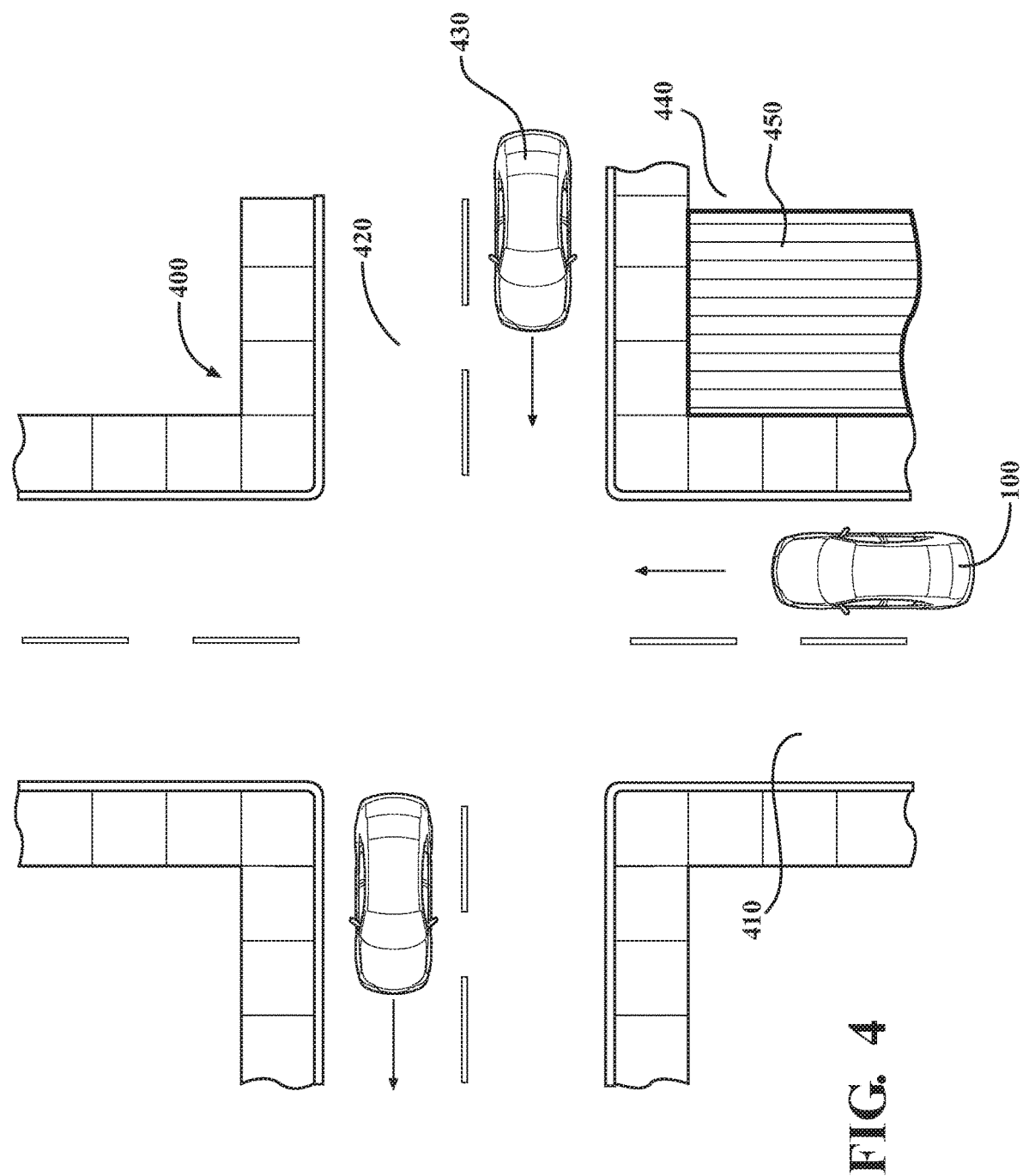
FIG. 4 illustrates another environment, an intersection of surface streets, in which systems and methods disclosed herein may be deployed, in accordance with another illustrative embodiment of the invention.

FIG. 4 illustrates another environment, an intersection of surface streets, in which systems and methods disclosed herein may be deployed, in accordance with another illustrative embodiment of the invention. In FIG. 4, an intersection 400 is formed by the intersection of first roadway 410 with second roadway 420, which are surface streets. Vehicle 100 (the "ego vehicle") is traveling on the first roadway 410, and a moving object 430 (e.g., an automobile) is traveling on the second roadway 420. A non-roadway region 440 (a corner) abuts the first roadway 410 and the second roadway 420. FIG. 4 depicts a sensor obstruction 450 (e.g., a building) in the non-roadway region 440. The same principles of the various embodiments of the invention described above can be applied to the surface-street-intersection environment shown in FIG. 4.

Additional aspects of intersection management system 170 will be discussed in relation to FIG. 5. FIG. 5 illustrates a flowchart of a method 500 that is associated with determining whether a vehicle is capable of navigating an intersection in an autonomous driving mode. Method 500 will be discussed from the perspective of the intersection management system 170 of FIGS. 1 and 2. While method 500 is discussed in combination with the intersection management system 170, it should be appreciated that the method 500 is not limited to being implemented within the intersection management system 170 but is instead one example of a system that may implement the method 500.

Referring to FIG. 5, at block 510, intersection detection module 220 detects, during each layer drive, that the vehicle 100, while traveling on a first roadway, is approaching an intersection of the first roadway with a second roadway. For example, intersection detection module 220 may cause the one or more processors to analyze stored map data 116 and GPS coordinates received from navigation system 147. In some embodiments, intersection detection module 220 can also cause the one or more processors 110 to retrieve data from the sensors of a sensor system 120 of the vehicle 100 in connection with detecting that the vehicle 100 is approaching an intersection. When intersection detection module 220 has detected that vehicle 100 is approaching an intersection, intersection detection module 220 informs intersection characterization module 230.

At block 520, intersection characterization module 230 detects, during each layer drive, one or more moving objects traveling on the second roadway. Moving objects can include, without limitation, automobiles, bicycles, motorcycles, and pedestrians. Intersection characterization module 230 detects the one or more moving objects by causing the one or more processors 110 to analyze data received from the sensor system 120. The sensor data analyzed can include, without limitation, one or more of camera image, LIDAR, RADAR, and Sonar data. Techniques for identifying and tracking both stationary and moving objects in the context of autonomous vehicles using such sensor data are well known in the art.

At block 530, intersection characterization module 230 produces, during each layer drive, an estimate of a profile of each of one or more sensor obstructions situated in a non-roadway region that abuts the intersection. This estimate is based on the detected one or more moving objects traveling on the second roadway. In one embodiment, this estimate is a polygonal profile of the sensor obstruction.

At decision block 540, if intersection characterization module 230 is configured to require that additional layer drives be completed, control returns to block 510, and blocks 510, 520, and 530 are repeated. If, at decision block 540, sufficient layer drives have been completed, control proceeds to block 550, where intersection characterization module 230 combines, for each sensor obstruction, the estimates of the profile of that sensor obstruction obtained from the layer drives to produce a composite estimate of the profile of that sensor obstruction. As explained above, in one embodiment, this includes superposing the polygonal profile estimates from the layer drives to form the composite estimate.

At block 560, intersection characterization module 230 determines, based at least in part on the composite estimate of the profile of each sensor obstruction, whether navigating the intersection in an autonomous driving mode of the vehicle is achievable. This determination can be based on a variety of criteria, as discussed above, but the primary criterion is whether or not intersection characterization module 230 is able to establish that one or more clear paths for detecting moving objects such as other automobiles via sensor system 120 exist as vehicle 100 approaches the intersection.

FIG. 6 is a flowchart of a method of determining whether a vehicle is capable of navigating an intersection in an autonomous driving mode, in accordance with another illustrative embodiment of the invention. The method 600 of FIG. 6 is similar to method 500 in FIG. 5 except that, at block 610 in method 600, intersection characterization module 230 produces profile estimates of both sensor obstructions and unobstructed zones during the layer drives. At block 630, intersection characterization module 230 produces composite estimates of the profiles of both sensor obstructions and unobstructed zones. At block 640, the determination of whether autonomous navigation of the intersection is achievable is based, at least in part, on the composite estimates of the profiles of both the sensor obstructions and the unobstructed zones. A given non-roadway region may include only a single unobstructed zone (no sensor obstructions), or it may include only a single sensor obstruction (no unobstructed zones).

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the intersection management system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the intersection management system 170, and/or the autonomous driving module(s) 160 may control some or all of these vehicle systems 140 and, thus, may be partially or fully autonomous.

The processor(s) 110, the intersection management system 170, and/or the autonomous driving module(s) 160 can be operably connected to communicate with the various vehicle systems 140 and/or individual components thereof. For example, returning to FIG. 1, the processor(s) 110, the intersection management system 170, and/or the autonomous driving module(s) 160 can be in communication to send and/or receive information from the various vehicle systems 140 to control the movement, speed, maneuvering, heading, direction, etc. of the vehicle 100. The processor(s) 110, the intersection management system 170, and/or the autonomous driving module(s) 160 may control some or all of these vehicle systems 140.

The processor(s) 110, the intersection management system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the intersection management system 170, and/or the autonomous driving module(s) 160 can control the direction and/or speed of the vehicle 100. The processor(s) 110, the intersection management system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the intersection management system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for determining whether a vehicle is capable of navigating an intersection in an autonomous driving mode, comprising:
   one or more processors;
   a memory communicably coupled to the one or more processors and storing:
   an intersection detection module including instructions that when executed by the one or more processors cause the one or more processors to detect, during each of one or more layer drives in which the vehicle is traveling on a first roadway, that the vehicle is approaching an intersection of the first roadway with a second roadway;
   an intersection characterization module including instructions that when executed by the one or more processors cause the one or more processors to:
   detect, during each of the one or more layer drives, one or more moving objects traveling on the second roadway;
   produce, during each of the one or more layer drives, an estimate of a profile of each of one or more stationary sensor obstructions situated in a non-roadway region abutting the intersection based on the detected one or more moving objects;
   combine, for each of the one or more stationary sensor obstructions, the estimates of the profile of that stationary sensor obstruction obtained from the one or more layer drives to produce a composite estimate of the profile of that stationary sensor obstruction; and
   determine, based at least in part on the composite estimate of the profile of each of the one or more stationary sensor obstructions, whether navigating the intersection in an autonomous driving mode of the vehicle is achievable.

2. The system of claim 1, wherein the first roadway is an on-ramp and the second roadway is one of a controlled-access highway and a limited-access highway.

3. The system of claim 1, wherein the first roadway is one of a controlled-access highway and a limited-access highway and the second roadway is an on-ramp.

4. The system of claim 1, wherein the first and second roadways are surface streets.

5. The system of claim 1, wherein each of the one or more moving objects is one of an automobile, a bicycle, a motorcycle, and a pedestrian.

6. The system of claim 1, wherein the intersection characterization module further includes instructions to:
   produce, during each of the one or more layer drives, an estimate of a profile of each of one or more unobstructed zones situated in the non-roadway region based on the detected one or more moving objects;
   combine, for each of the one or more unobstructed zones, the estimates of the profile of that unobstructed zone obtained from the one or more layer drives to produce a composite estimate of the profile of that unobstructed zone; and
   determine, based at least in part on the composite estimate of the profile of each of the one or more unobstructed zones, whether navigating the intersection in an autonomous driving mode of the vehicle is achievable.

7. The system of claim 1, wherein the intersection characterization module includes instructions to produce, during each of the one or more layer drives, the estimate of the profile of each of one or more stationary sensor obstructions situated in the non-roadway region by measuring at least one position of each of the one or more moving objects.

8. The system of claim 1, wherein the intersection characterization module further includes instructions to notify a human occupant of the vehicle that navigating the intersection in an autonomous driving mode of the vehicle is one of achievable and non-achievable.

9. The system of claim 1, wherein the intersection characterization module further includes instructions to notify a human occupant of the vehicle that a stationary sensor obstruction not detected during one or more prior layer drives has been detected during a current layer drive.

10. The system of claim 1, wherein each estimate of the profile of a stationary sensor obstruction is a polygon and the intersection characterization module includes instructions to produce the composite estimate of the profile of that stationary sensor obstruction by superposing a plurality of polygons obtained from a plurality of layer drives.

11. The system of claim 10, wherein the intersection characterization module further includes instructions to apply a statistical confidence interval to the superposed plurality of polygons.

12. The system of claim 1, wherein the estimate of the profile of a stationary sensor obstruction produced during a given layer drive automatically expires after a predetermined period.

13. A non-transitory computer-readable medium for determining whether a vehicle is capable of navigating an intersection in an autonomous driving mode and storing instructions that when executed by one or more processors cause the one or more processors to:
  detect, during each of one or more layer drives in which the vehicle is traveling on a first roadway, that the vehicle is approaching an intersection of the first roadway with a second roadway;
  detect, during each of the one or more layer drives, one or more moving objects traveling on the second roadway;
  produce, during each of the one or more layer drives, an estimate of a profile of each of one or more stationary sensor obstructions situated in a non-roadway region abutting the intersection based on the detected one or more moving objects;
  combine, for each of the one or more stationary sensor obstructions, the estimates of the profile of that stationary sensor obstruction obtained from the one or more layer drives to produce a composite estimate of the profile of that stationary sensor obstruction; and
  determine, based at least in part on the composite estimate of the profile of each of the one or more stationary sensor obstructions, whether navigating the intersection in an autonomous driving mode of the vehicle is achievable.

14. The non-transitory computer-readable medium of claim 13, wherein the stored instructions include further instructions that when executed by the one or more processors cause the one or more processors to:
  produce, during each of the one or more layer drives, an estimate of a profile of each of one or more unobstructed zones situated in the non-roadway region based on the detected one or more moving objects;
  combine, for each of the one or more unobstructed zones, the estimates of the profile of that unobstructed zone obtained from the one or more layer drives to produce a composite estimate of the profile of that unobstructed zone; and
  determine, based at least in part on the composite estimate of the profile of each of the one or more unobstructed zones, whether navigating the intersection in an autonomous driving mode of the vehicle is achievable.

15. The non-transitory computer-readable medium of claim 13, wherein the instructions to produce, during each of the one or more layer drives, an estimate of the profile of each of one or more stationary sensor obstructions based on the detected one or more moving objects include instructions to measure at least one position of each of the one or more moving objects.

16. A method of determining whether a vehicle is capable of navigating an intersection in an autonomous driving mode, the method comprising:
  detecting, during each of one or more layer drives in which the vehicle is traveling on a first roadway, that the vehicle is approaching an intersection of the first roadway with a second roadway;
  detecting, during each of the one or more layer drives, one or more moving objects traveling on the second roadway;
  producing, during each of the one or more layer drives, an estimate of a profile of each of one or more stationary sensor obstructions situated in a non-roadway region abutting the intersection based on the detected one or more moving objects;
  combining, for each of the one or more stationary sensor obstructions, the estimates of the profile of that stationary sensor obstruction obtained from the one or more layer drives to produce a composite estimate of the profile of that stationary sensor obstruction; and
  determining, based at least in part on the composite estimate of the profile of each of the one or more stationary sensor obstructions, whether navigating the intersection in an autonomous driving mode of the vehicle is achievable.

17. The method of claim 16, further comprising:
  producing, during each of the one or more layer drives, an estimate of a profile of each of one or more unobstructed zones situated in the non-roadway region based on the detected one or more moving objects;
  combining, for each of the one or more unobstructed zones, the estimates of the profile of that unobstructed zone obtained from the one or more layer drives to produce a composite estimate of the profile of that unobstructed zone; and
  determining, based at least in part on the composite estimate of the profile of each of the one or more unobstructed zones, whether navigating the intersection in an autonomous driving mode of the vehicle is achievable.

18. The method of claim 16, wherein producing, during each of the one or more layer drives, an estimate of the profile of each of one or more stationary sensor obstructions based on the detected one or more moving objects includes measuring at least one position of each of the one or more moving objects.

19. The method of claim 16, wherein each estimate of the profile of a stationary sensor obstruction is a polygon and producing the composite estimate of the profile of that stationary sensor obstruction includes superposing a plurality of polygons obtained from a plurality of layer drives.

20. The method of claim 19, wherein producing the composite estimate further includes applying a statistical confidence interval to the superposed plurality of polygons.

* * * * *